United States Patent [19]

Fouassier et al.

[11] 4,422,007

[45] Dec. 20, 1983

[54] LUMINESCENT SUBSTANCES HAVING A BASE OF DOUBLE BORATE OF MAGNESIUM AND RARE EARTHS AND LOW PRESSURE MERCURY VAPOR LAMP CONTAINING THE SAME

[75] Inventors: Claude Fouassier, Gradignan; Bernadette Saubat, Seyssinet, both of France

[73] Assignee: Rhone Poulenc Industries, Paris, France

[21] Appl. No.: 274,362

[22] Filed: Jun. 17, 1981

[30] Foreign Application Priority Data

Jun. 27, 1980 [FR] France ................ 80 14307

[51] Int. Cl.$^3$ ............... C09K 11/475; H01J 1/63
[52] U.S. Cl. ............... 313/486; 252/301.4 R; 423/263; 423/277
[58] Field of Search ........... 252/301.4 R; 428/690; 313/486; 423/263, 277

[56] References Cited

U.S. PATENT DOCUMENTS 4,319,161 3/1982 Looye et al. ............ 428/690 X

FOREIGN PATENT DOCUMENTS 2410134 9/1974 Fed. Rep. of Germany..252/301.4 R
43-300 1/1968 Japan ............................ 252/301.4 R

OTHER PUBLICATIONS

Looye et al., "Chem. Abstracts", vol. 94, 5/81, 166460r.
Saubat et al., "Chem. Abstracts", vol. 94, 4/81, 129818t.
Blasse et al., "The Journal of Chemical Physics", vol. 47, No. 6, 1967, pp. 1920–1926.

*Primary Examiner*—Jack Cooper

[57] ABSTRACT

New luminescent substances are disclosed. They have a monoclinic crystalline structure and are formed of a double borate of magnesium and rare earths having the general formula $Ln_{1-x}Tb_xMgB_5O_{10}$ in which Ln represents at least one element selected from the group consisting of the lanthanides and yttrium and in which $0 \leq x \leq 1$. The luminescent substances can be used in screens or tubes, for example, in low-pressure mercury vapor discharge lamps and plasma panels.

4 Claims, 3 Drawing Figures

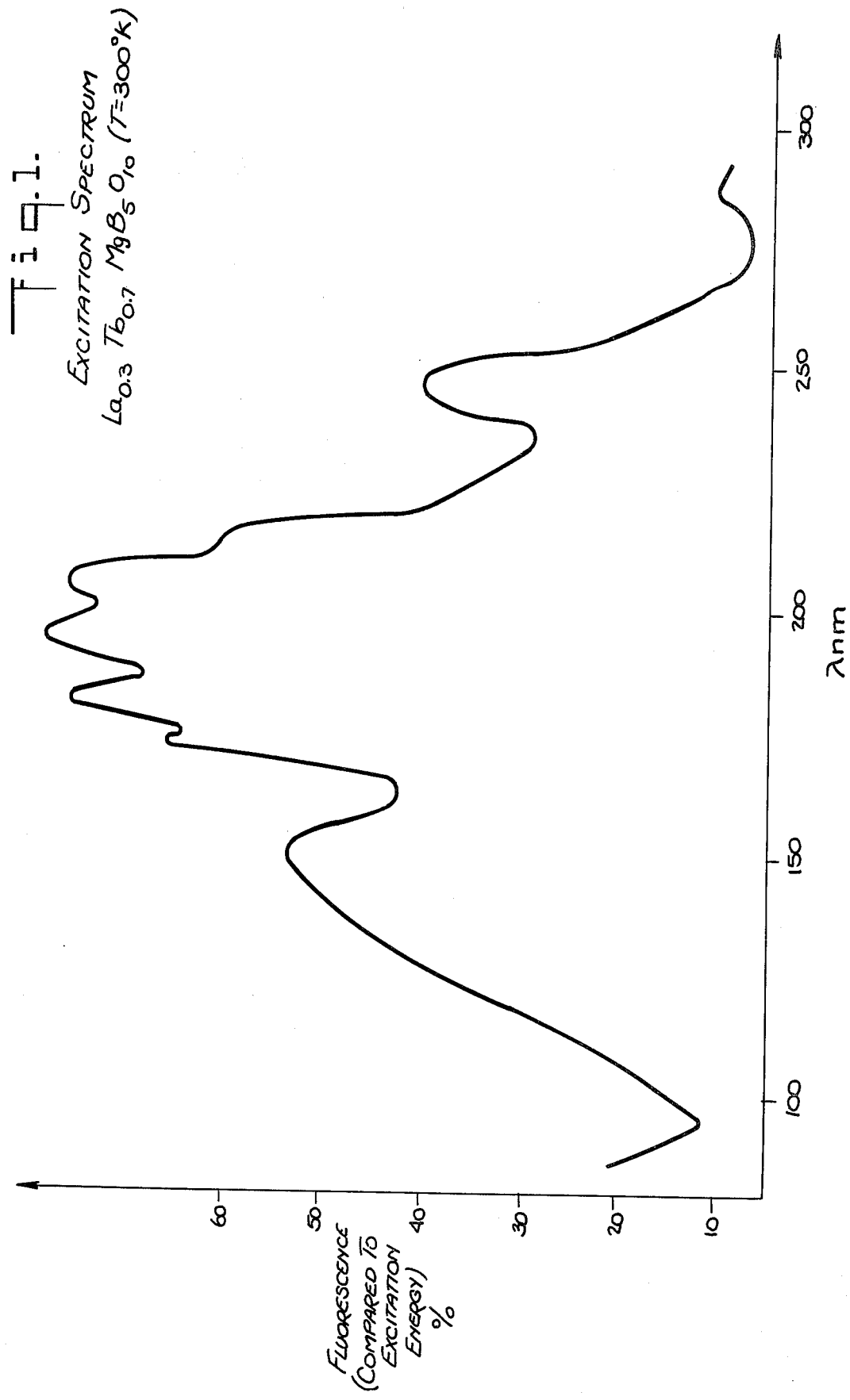

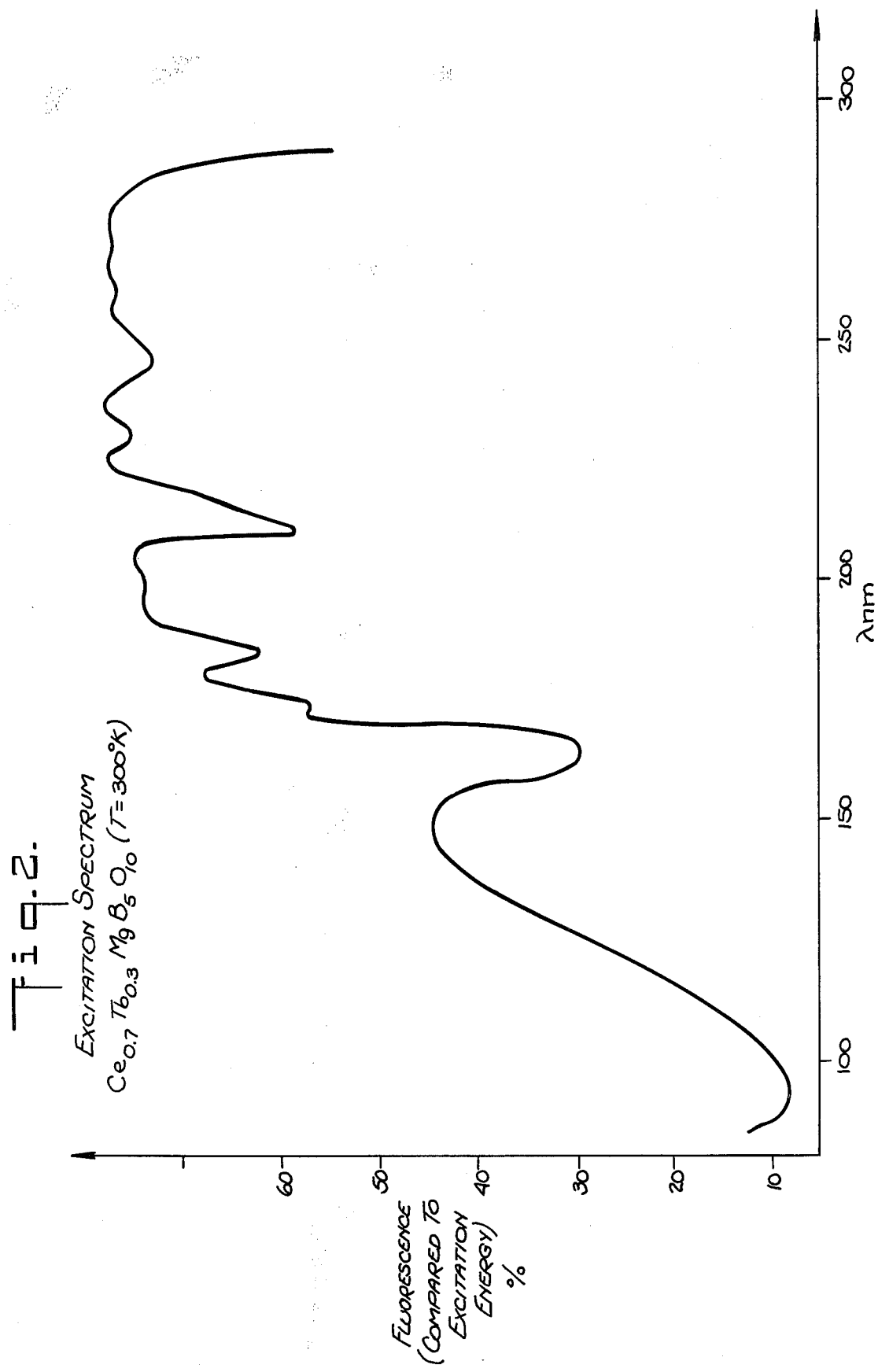

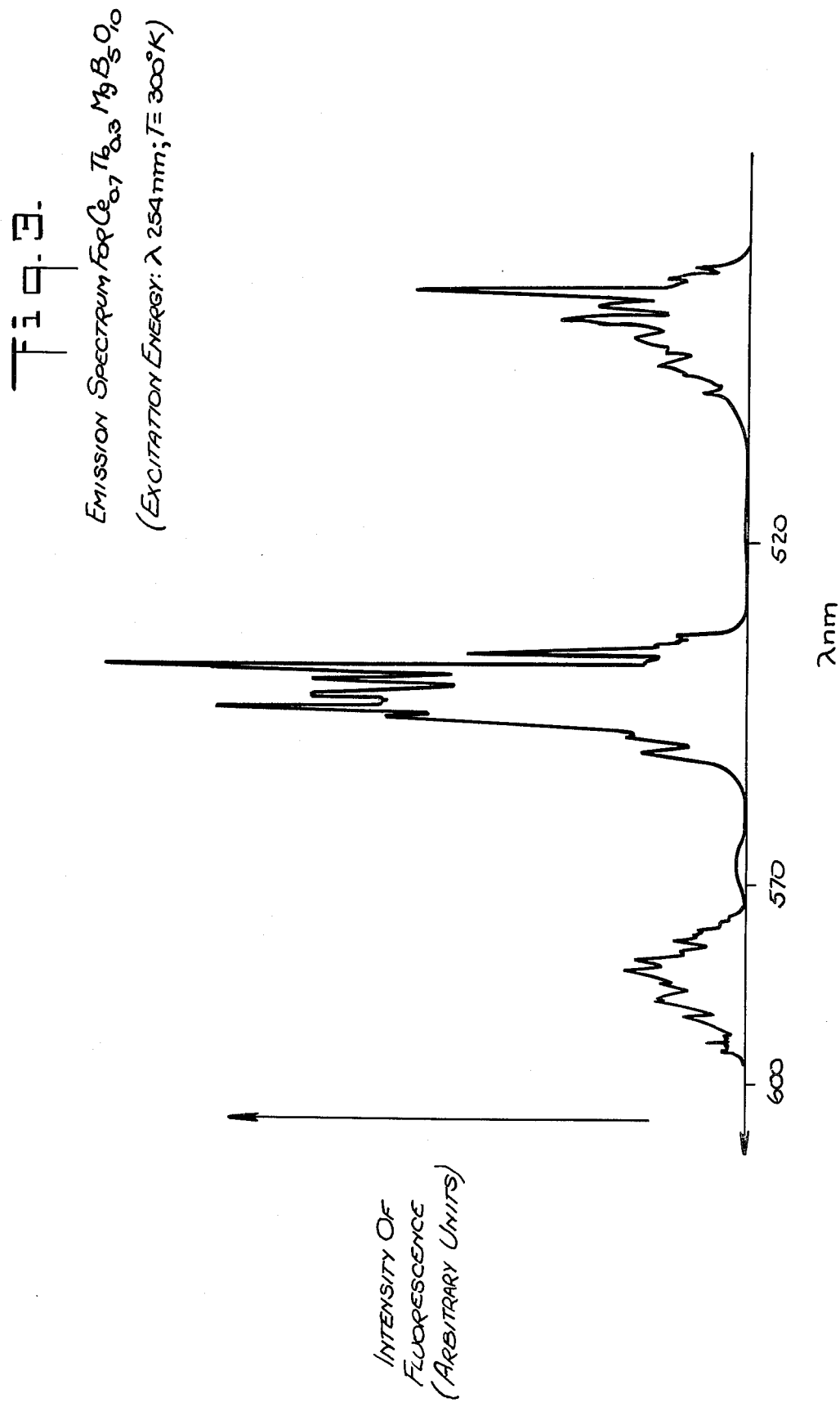

LUMINESCENT SUBSTANCES HAVING A BASE OF DOUBLE BORATE OF MAGNESIUM AND RARE EARTHS AND LOW PRESSURE MERCURY VAPOR LAMP CONTAINING THE SAME

BACKGROUND OF THE INVENTION

The present invention concerns new luminescent substances having a base of double borate of magnesium and rare earths useful in screens or tubes.

Numerous luminescent substances are known which, when activated with terbium, show emission in the green.

SUMMARY OF THE INVENTION

The object of the present invention is to provide, in particular, a new luminescent substances containing terbium which, when they are suitably excited, present a very intense emission.

The present invention concerns a luminescent substance characterized by the fact that it has a monoclinic crystalline structure and by the fact that it is formed of a double borate of magnesium and rare earths having the general formula $Ln_{1-x}Tb_xMgB_5O_{10}$, in which Ln represents at least one element selected from the group consisting of the lanthanides and yttrium and in which $0 \leq x \leq 1$.

A particularly important economic advantage of the present invention is that high luminous yields are obtained for relatively low concentrations of terbium. Due to their insolubility in water the luminescent borates can be easily applied by ordinary methods.

DESCRIPTION OF THE DRAWINGS

In order to more fully describe the present invention, the following drawings are provided in which:

FIG. 1 shows the excitation spectrum of $La_{0.3}Tb_{0.7}MgB_5O_{10}$ (T=300° K.) wherein the y axis shows the quantum yield of fluorescence emission;

FIG. 2 shows the excitation spectrum of $Ce_{0.7}Tb_{0.3}MgB_5O_{10}$ (T=300° K.) wherein the y axis shows the quantum yield of fluorescence emission; and FIG. 3 shows the emission spectrum of $Ce_{0.7}Tb_{0.3}MgB_5O_{10}$ wherein the excitation energy $\lambda=254$ nm (T=300° K.).

DETAILED DESCRIPTION OF THE INVENTION

The present invention concerns a luminescent substance characterized by the fact that it has a monoclinic crystalline structure and by the fact that it is formed of a double borate of magnesium and rare earths having the general formula $Ln_{1-x}Tb_xMgB_5O_{10}$, in which Ln represents at least one element selected from the group consisting of the lanthanides and yttrium and in which $0 \leq x \leq 1$.

In accordance with a preferred embodiment of the invention, the value of x in the above formula is from about 0.15 to about 0.80 ($0.15 \leq x \leq 0.80$). It generally is found that below 0.15 the concentration of terbium in the luminophor of the invention is not sufficient to give satisfactory emission and that above 0.80 the interactions lead to disturbing self-extinction phenomena.

A luminescent borate in accordance with the invention can be suitably excited by electrons, x-rays, ultraviolet rays, and, in particular, ultraviolet rays of short wavelength. The spectral distribution of the radiation emitted by the borate is that of the radiation of terbium, a characteristic emission which is formed of an intense narrow peak (half-width about 10 nm) at about 538 nm, accompanied by several secondary emissions.

The structure of the luminescent substances in accordance with the invention is a monoclinic structure formed of bi-dimensional layers $(B_5O_{10})_n$ bound together by atoms of rare earths (lanthanide and/or yttrium) and magnesium. The oxidized coordination polyhedrons of rare earths form isolated chains and that limits the interactions responsible for the self-extinction of terbium.

One particularly interesting group of luminescent substances in accordance with the invention is formed of compounds in which Ln is cerium, alone or mixed with one or more of the elements lanthanum, gadolinium, yttrium, and lutetium. Such substances supply very high luminous fluxes when excited by ultraviolet rays, in particular by means of radiations coming from a discharge in low-pressure mercury vapor. Cerium strongly absorbs the excitation radiation and a transfer of energy takes place from cerium to terbium.

The invention therefore also has as its object a luminescent substance characterized by the fact that it has the general formula $Ln'_{1-x-y}Tb_xCe_yMgB_5O_{10}$ in which Ln' is preferably at least one element selected from the group consisting of La, Gd, Lu, and Y and in which $0 \leq x \leq 1$ and $0 \leq y \leq 1$, x being preferably from about 0.15 to about 0.80 ($0.15 \leq x \leq 0.80$) and y preferably being from about 0.10 to about 0.85 ($0.10 \leq y \leq 0.85$).

The luminescent borates of the invention can be used in screens or tubes. In particular, they can be advantageously used (in combination with other luminescent substances) as the green component in discharge lamps, for example, in low-pressure mercury vapor lamps serving for purposes of illumination.

Another possibility for the use of the borates of the invention is in low-pressure mercury vapor discharge lamps intended for special illuminating purposes in which a narrow-band emission in the green portion of the spectrum is desirable, for instance, in xerographic copying apparatus. Such special lamps are frequently subjected to a high charge so that the luminescent screen is brought to a relatively high temperature. The luminescent borates of the present invention have the advantage of having a good variation, as a function of the temperature, of the luminous flux, which makes it possible to use them without drawback in such high-charge lamps.

One particularly advantageous use of the borates of the invention is in plasma panels in which the excitation radiation is of short wavelength (between about 100 nm and about 300 nm, more particularly about 150 nm for xenon discharge). At these wavelengths, the borates have an intense absorption band due to the boron-oxygen network and are not degraded by this radiation.

The luminescent borates of the invention are prepared preferably by reaction in solid state at high temperature. The starting materials may be the oxides of the metals required or organic or inorganic compounds capable of forming oxides by heating, such as the carbonates, oxalates, hydroxides, acetates, nitrates, and borates of said materials. The mixture of the compounds of the invention can also be prepared by co-precipitation from solutions of precursors of the desired oxides, for instance, from aqueous media.

To obtain a luminescent substance in accordance with this invention, it is advantageous to start from an intimate mixture, in suitable proportions, of all the compounds in a finely divided state. The mixture of starting materials is heated at least once for a period of between one hour and one day at a temperature from about 700° C. to about 1100° C. It is preferable to effect the last heating in a slightly reductive atmosphere to bring all the activators to trivalent state.

Other characteristics and advantages of the present invention will become more evident from the following examples, which are in no way to be considered as constituting a limitation on the invention.

EXAMPLE 1

The compound of the formula $TbMgB_5O_{10}$ was prepared from a mixture of the oxides $Tb_4O_7$, MgO, and $B_2O_3$.

| Starting Materials | Quantities Used |
|---|---|
| $Tb_4O_7$ | 3.738 g |
| MgO | 0.806 g |
| $B_2O_3$ | 3.480 g |

These starting materials are mixed homogeneously by crushing and the mixture is introduced into an alumina crucible and placed in an oven at 1000° C. for ten hours.

The resulting borate ($TbMgB_5O_{10}$) is in the form of a white powder which is insensitive to the action of water. Its x-ray diffraction spectrum can be indexed on basis of a monoclinic unit cell having the following parameters:

a = 8.630 ± 0.005 Å
b = 7.445 ± 0.005 Å
c = 12.394 ± 0.005 Å
α = 131.04 ± 0.05 degrees

EXAMPLE 2

The compound of the formula $La_{0.3}Tb_{0.7}MgB_5O_{10}$ was prepared from a mixture of oxides $La_2O_3$, $Tb_4O_7$, MgO, and $B_2O_3$.

| Starting Materials | Quantities Used |
|---|---|
| $La_2O_3$ | 0.977 g |
| $Tb_4O_7$ | 2.617 g |
| MgO | 0.806 g |
| $B_2O_3$ | 3.480 g |

The starting materials are mixed and treated in the same manner as in Example 1.

FIG. 1 shows the excitation spectrum of this product (analysis wavelength: 538 nm).

EXAMPLE 3

The compound of the formula $Ce_{0.7}Tb_{0.3}MgB_5O_{10}$ was prepared from a mixture of oxides $Tb_4O_7$, MgO, $B_2O_3$ and nitrate $Ce(NO_3)_3.6H_2O$:

| Starting Materials | Quantities Used |
|---|---|
| $Ce(NO_3)_3.6H_2O$ | 6.079 g |
| $Tb_4O_7$ | 1.121 g |
| MgO | 2.419 g |
| $B_2O_3$ | 6.266 g |

The starting materials are dissolved in a nitric acid solution, which is then evaporated to dryness by boiling. The residue is introduced into an alumina boat and heated at 1000° C. for ten hours in a slightly reductive atmosphere of argon containing 15% hydrogen. The product obtained is in the form of a white powder which is insensitive to the action of water.

FIG. 2 shows the excitation spectrum of the product obtained (analysis wavelength: 538 nm). FIG. 3 shows the emission spectrum of the product obtained within the wavelength range of 380 nm to 600 nm, excited by a monochromatic radiation of a wavelength of 253.7 nm (corresponding to the wavelength of the principal emission line of low-pressure mercury vapor lamps).

EXAMPLE 4

The compound of the formula $La_{0.3}Ce_{0.3}Tb_{0.4}MgB_5O_{10}$ was prepared from a mixture of oxides $La_2O_3$, $Tb_4O_7$, MgO, $B_2O_3$, and nitrate $Ce(NO_3)_3.6H_2O$:

| Starting Materials | Quantities Used |
|---|---|
| $La_2O_3$ | 0.977 g |
| $Ce(NO_3)_3.6H_2O$ | 2.605 g |
| $Tb_4O_7$ | 1.495 g |
| MgO | 2.419 g |
| $B_2O_3$ | 6.266 g |

The manner of preparation is identical to that indicated in Example 3. The product obtained is in the form of a white powder which is insensitive to the action of water. Under excitation at 253.7 nm it has an intense green emission comparable to that of the product of Example 3.

Variations and modifications will be obvious to one skilled in the art and the claims are intended to cover all modifications and variations that fall within the true spirit and scope of the invention.

We claim:

1. A luminescent substance characterized by the fact that it has a monoclinic crystalline structure and by the fact that it consists of a double borate of magnesium and rare earths and has the general formula $Ln_{1-x}Tb_xMgB_5O_{10}$ in which Ln represents at least one element selected from the group consisting of La, Gd, Lu, and Y and in which $0 \leq x \leq 1$; Tb being present in an amount sufficient to effect an intense narrow emission peak at about 538 nm.

2. The luminescent substance of claim 1 having the formula $TbMgB_5O_{10}$.

3. The luminescent substance of claim 1 having the formula $La_{0.3}Tb_{0.7}MgB_5O_{10}$.

4. A low-pressure mercury vapor lamp comprising a luminescent substance of any of claims 1 to 3.

UNITED STATES PATENT AND TRADEMARK OFFICE
CERTIFICATE OF CORRECTION

PATENT NO. : 4,422,007
DATED : December 20, 1983
INVENTOR(S) : Fouassier et al.

It is certified that error appears in the above—identified patent and that said Letters Patent is hereby corrected as shown below:

Title page, Item [76]

Jean-Philippe Browaeys, Paris, and Patrick Dougier, Andresy, both of France, should also be listed as inventors.

All occurrences of "$0 \leqq x \leqq 1$" should read --$0 < x \leqq 1$--.

All occurrences of "$0 \leqq y \leqq 1$" should read --$0 < y \leqq 1$--.

Signed and Sealed this

Nineteenth Day of March 1985

[SEAL]

Attest:

DONALD J. QUIGG

*Attesting Officer*    *Acting Commissioner of Patents and Trademarks*